US008210467B2

(12) United States Patent
Hubbell et al.

(10) Patent No.: US 8,210,467 B2
(45) Date of Patent: Jul. 3, 2012

(54) METHOD AND APPARATUS FOR HURRICANE SURVEILLANCE FROM THE EYE

(75) Inventors: Wesley H. Hubbell, St. Petersburg, FL (US); Victor G. Nastasi, Odessa, FL (US)

(73) Assignee: Raytheon Company, Waltham, MA (US)

( * ) Notice: Subject to any disclaimer, the term of this patent is extended or adjusted under 35 U.S.C. 154(b) by 1267 days.

(21) Appl. No.: 11/937,053

(22) Filed: Nov. 8, 2007

(65) Prior Publication Data

US 2011/0004368 A1    Jan. 6, 2011

Related U.S. Application Data

(60) Provisional application No. 60/864,999, filed on Nov. 9, 2006.

(51) Int. Cl.
*B64C 1/00* (2006.01)
*B64C 3/00* (2006.01)
*B64C 5/00* (2006.01)
*B64C 7/00* (2006.01)
*B64C 13/20* (2006.01)

(52) U.S. Cl. .......................................... 244/13; 244/190
(58) Field of Classification Search ................... 244/31, 244/189, 190, 24, 33; 702/3; 73/170.16, 73/170.02
See application file for complete search history.

(56) References Cited

U.S. PATENT DOCUMENTS 5,470,032 A * 11/1995 Williams et al. ............ 244/1 TD
2007/0296574 A1* 12/2007 Smith et al. ............. 340/539.13

OTHER PUBLICATIONS

Eisenberg, Anne, "What's Next; From a Hurricane's Eye, Skydiving Sensors Yield Answers", Apr. 3, 2003, The New York Times (Technology), pp. 1-2.*
The Hurricane Field Program Experiments, "Eyewall Vertical Motion Structure Experiment", Apr. 29, 1997, NOAA (AOML/Hurricane Research Division), pp. 1-3.*
Notification Concerning Transmittal of International Preliminary Report on Patentability (Chapter 1 of the Patent Cooperation Treaty) and the Written Opinion of the International Searching Authority, PCT/US2007/023542 dated May 22, 2009, 7 pages.
PCT/US2007/023542 PCT International Search Report dated May 26, 2008.
G.J. Holland, The Aerosonde Robotic Aircraft: A New Paradigm for Environmental Observations, Bulletin of the American Meteorological Society, vol. 82, No. 5, May 2001, pp. 889-901.
John S. Langford, An Unmanned Aircraft for Dropwindsonde Deployment and Hurricaine Reconnaissance, Bulletin American Meteorological Society, vol. 74, No. 3, Mar. 1993, pp. 367-375.
Daniel Esteban Fernandez, IWRAP: The Imaging Wind and Rain Airborne Profiler for Remote Sensing of the Ocean and the Atmosphere Boundary Layer Within Tropical Cyclones, IEEAC Paper #163, pp. 1-7, Aug. 2005.

* cited by examiner

*Primary Examiner* — Tien Dinh
*Assistant Examiner* — Valentina Xavier
(74) *Attorney, Agent, or Firm* — Daly, Crowley, Mofford & Durkee, LLP

(57) ABSTRACT

Methods and apparatus to provide an aerial vehicle having an eyewall sensor to enable the aerial vehicle to stay within the eye of a hurricane and transmit weather information to a remote location. In one embodiment, the aerial vehicle is an unmanned aerial vehicle (UAV) launched into the eye of the hurricane.

17 Claims, 5 Drawing Sheets

METHOD AND APPARATUS FOR HURRICANE SURVEILLANCE FROM THE EYE

CROSS REFERENCE TO RELATED APPLICATIONS

The present application claims the benefit of U.S. Provisional Patent Application No. 60/864,999, filed on Nov. 9, 2006, which is incorporated herein by reference.

BACKGROUND

As is known in the art, hurricanes can be very destructive upon reaching land. As is also known, accurately predicting the path, storm surge, and intensity of a hurricane would be extremely valuable in saving lives and reducing property damage. For example, particular locations could be evacuated with a high level of confidence that the storm will strike that location. Evacuation costs have been estimated at a million dollars per mile of coastline—so accuracy also saves money by reducing unnecessary evacuations.

Obtaining data for a hurricane is challenging. While radar systems can provide some information on the storm, there are significant limitations on the type of information that can be obtained using radar. Radar range is limited and current land-based radars provide data too late for long range forecasting. Satellites are unable to provide continuous data as they either make passes over the storm or, for those stationed over the storm, take snapshots of data. Thus, readings of temperature, pressure, humidity, and especially microwave imaging and sounders to provide wave height and eyewall structure, are not available for storm modeling. Models of storms and hurricanes are dependent upon data taken from within the storm. While radar may be able to provide some storm information, the lack of accurate low altitude information, particularly from the eye of a hurricane, decreases the ability to make accurate path predictions for the storm. For all the science and interest in these dangerous storms—the eye is relatively unexplored—yet the eye is central for those interested in the storm (e.g., forecasters/modelers, emergency personnel, and those in the path). Known storm data collection mechanisms do not provide continual, direct in-situ (low altitude) observations from within the eye. Such data would provide scientific and visual information that could be used by meteorologists, emergency personnel, news reporting organizations, etc.

While some attempts have been made to fly aircraft into a hurricane vortex, the level of pilot safety and risk to the aircraft is significant. For example, the eye can be surrounded by thunderstorms that can climb to 60,000 feet, extremely strong alternating upward and downward air turbulence stress the aircraft and crew, while rapid ice accumulation and large hail can cause significant damage to the aircraft. Reducing the number of flights or eliminating the need for them would lessen these risks. Other aircraft fly over the hurricane to obtain storm data, however, the data that can be obtained from a high altitude aircraft is limited.

The National Hurricane Center and/or the National Weather Service (NWS) of NOAA and similar agencies use various tools in attempt to monitor and track hurricanes. Indirect measurements from satellite data is the primary tool. Secondary tools include information from ships and buoys. As the storm approaches land, direct measurement of storm characteristics can be obtained from aircraft, radiosondes and automated surface observing stations. Particularly when the storm is less than about two hundred miles out from the land, radar can be provide significant indirect storm measurements. News reporting services also lack live data from within the eye.

BRIEF DESCRIPTION OF THE DRAWINGS

The foregoing features of this invention, as well as the invention itself, may be more fully understood from the following description of the drawings in which.

DETAILED DESCRIPTION

In general, the present invention provides methods and apparatus for an aerial vehicle to fly within the eye of a hurricane to obtain and transmit information on the hurricane. With this arrangement, information from relatively low altitudes can be provided for weather and news reporting, enhanced storm modeling and increased path prediction. While the invention is primarily shown and described in conjunction with hurricanes and exemplary air vehicles and delivery systems, it is understood that the invention is applicable to a variety of similar weather systems (that feature an eye type center such as tropical storms, cyclones, hurricanes or typhoons, etc.), vehicles and delivery mechanisms. In addition, the term hurricane means any weather system having a discernible eye.

Figure 1:
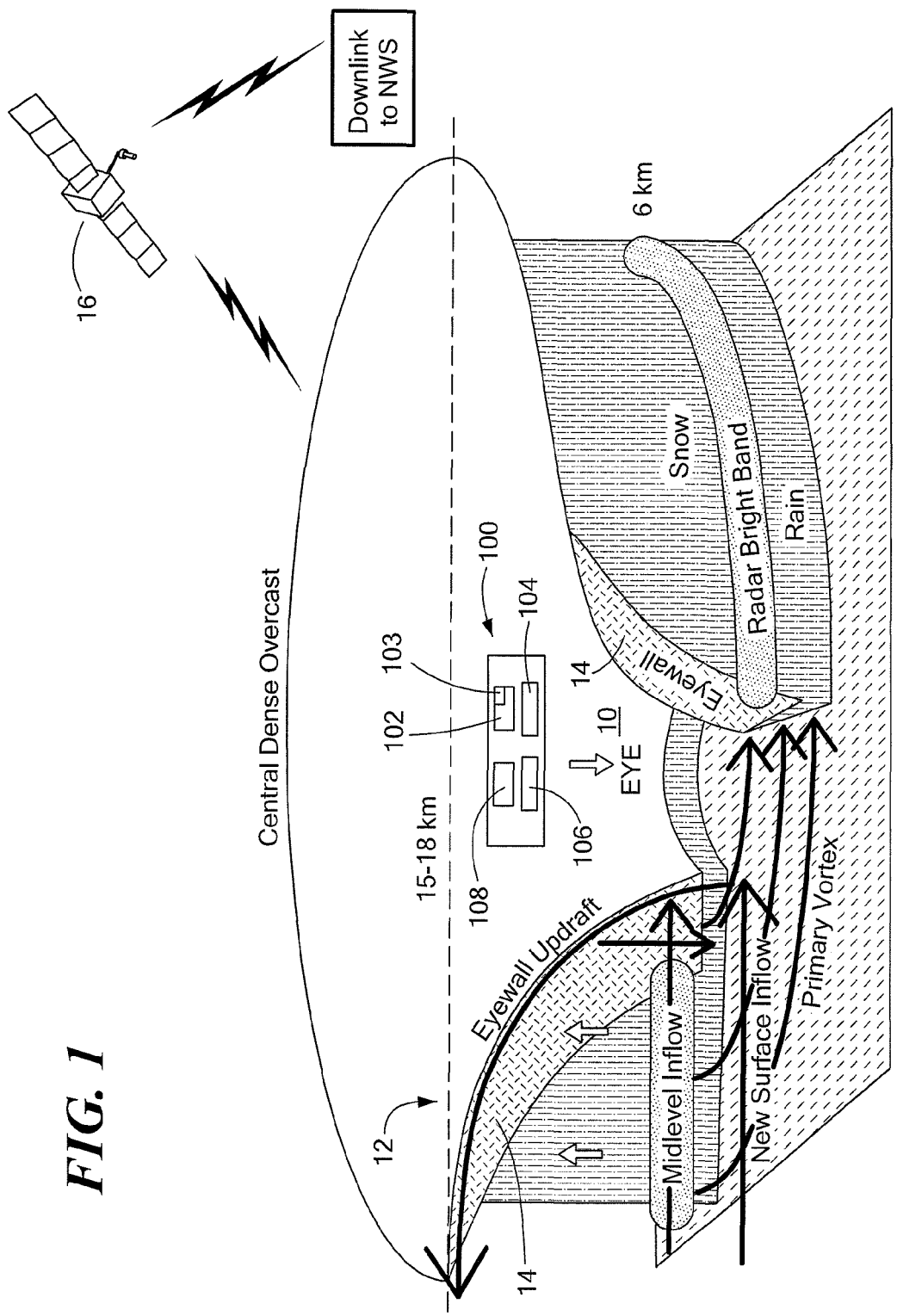
FIG. 1 is a pictorial representation of a UAV having an eyewall sensor flying in the eye of a hurricane.
Figure 2:
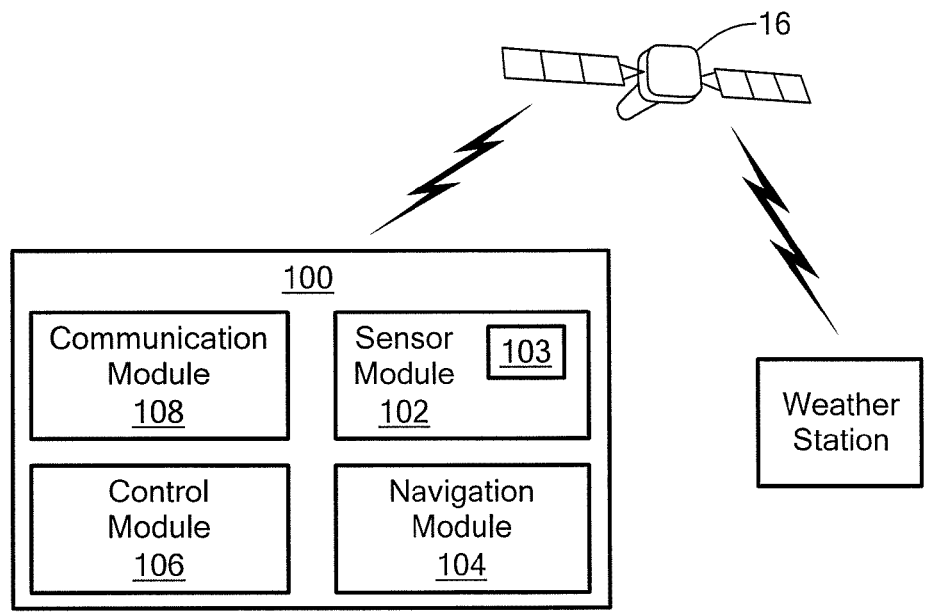
FIG. 2 is a schematic depiction of a UAV in accordance with exemplary embodiments of the invention.

FIGS. 1 and 2 show a vehicle 100, shown as an unmanned aerial vehicle (UAV) loitering in the eye 10 of a hurricane 12. The vehicle 100 includes a sensor module 102 including an eyewall sensor 103 to detect the walls 14 that define the eye 10 of the hurricane. As is known in the art, the eye walls 14 are defined by a distinct radar band indicative of intense thunderstorm and rain activity.

The eyewall sensor 103 is coupled to a navigation system 104 to enable the UAV 100 to be steered so that the UAV stays within the eye 10. For example, the navigation module 108 controls the altitude and heading of the UAV. A control module 106 provides overall control of the UAV and a communication module 108 enables the UAV to communicate via wireless link, for example.

In one embodiment, the navigation module 104 receives remote direction from a user via the communication module 108. In an exemplary embodiment, the user will have access to information from the eyewall sensor 103 to maintain the UAV within the eye 10. In an alternative embodiment, the UAV 100 is autonomous and uses eyewall sensor 103 information to automatically stay within the eye 10 of the hurricane.

In an exemplary embodiment, a communication module 110 enables the UAV to transmit and/or receive information with a remote site, such as via satellite 16 links. It is understood that the UAV 100 can communicate using any suitable channel. In addition, the UAV 100 can communicate with other aircraft, ships, etc.

In one embodiment, the UAV 100 is provided as a lighter than air (LTA) vehicle that flies at a desired altitude. As is known in the art, the eye of a hurricane is relatively calm so that a LTA vehicle can fly within the eye with little turbulence. The LTA can be modified to carry desired news reporting, sensor, and weather equipment.

The UAV 100 can carry a variety of sensors and equipment to obtain data, such as eyewall location, images, pressure, humidity, wave height, audio/video, etc. It is understood that the exemplary UAV embodiments including eyewall sensors have limited payloads. It is contemplated that larger UAVs will have greater payloads that enable carrying more and heavier equipment without departing from the present invention.

In one embodiment, the UAV 100 can release a series of weather balloons (or other smaller UAVs) that can disperse to provide additional news reporting and weather information, such as via a wireless communication link. For example, the balloons may provide information to track steering currents for the storm.

Figure 3:
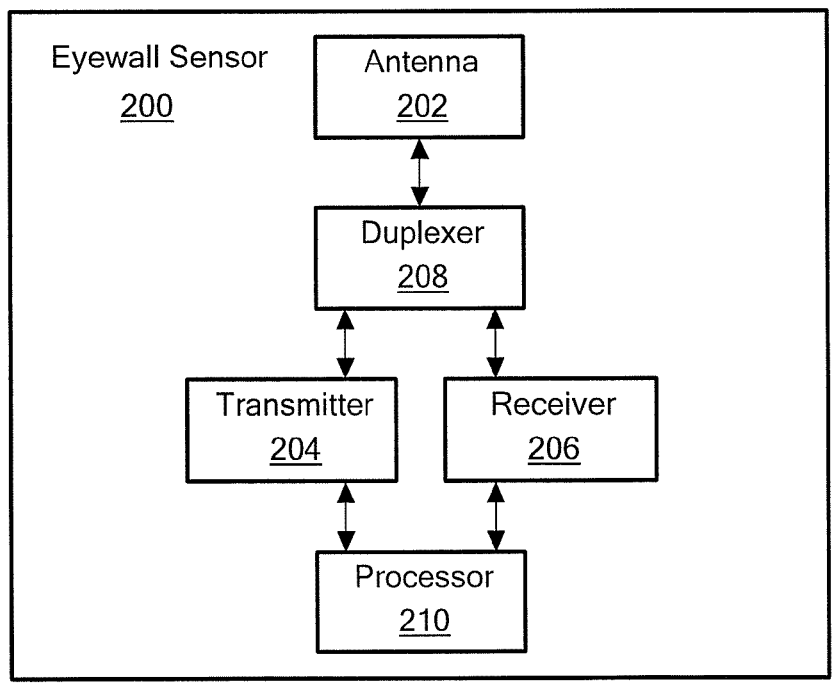
FIG. 3 is a block diagram of an eyewall sensor that can be carried in a UAV in accordance with exemplary embodiments of the invention.

In an exemplary embodiment shown in FIG. 3, the eyewall sensor 200 includes a radar, such as a Doppler type radar to detect the eyewall of the hurricane. It is understood that a variety of radar types can be used to meet the needs, e.g., size, weight, power, etc, of a particular application.

In an exemplary embodiment, a radar-based eyewall sensor 200 includes an antenna 202 to transmit energy from a transmitter 204 and receive returns for a receiver 206 via a duplexer 208. A processor module 210 controls the overall operation of the eyewall sensor and enables communication with the control module 106 (FIG. 2), for example.

In an exemplary embodiment, the Doppler radar operates at microwave frequencies to sense the eyewall location and to provide windspeed data. In other embodiments, a GHz signal, e.g., 70-100 GHz, is transmitted that can provide a return from the eyewall. Based on the signal transmission and return the eyewall sensor can determine the location of the eyewall. In one embodiment, an antenna could be directed downward to determine altitude to provide navigation information. Suitable signal frequencies and signal processing techniques will be readily apparent to one of ordinary skill in the art.

Figure 4:
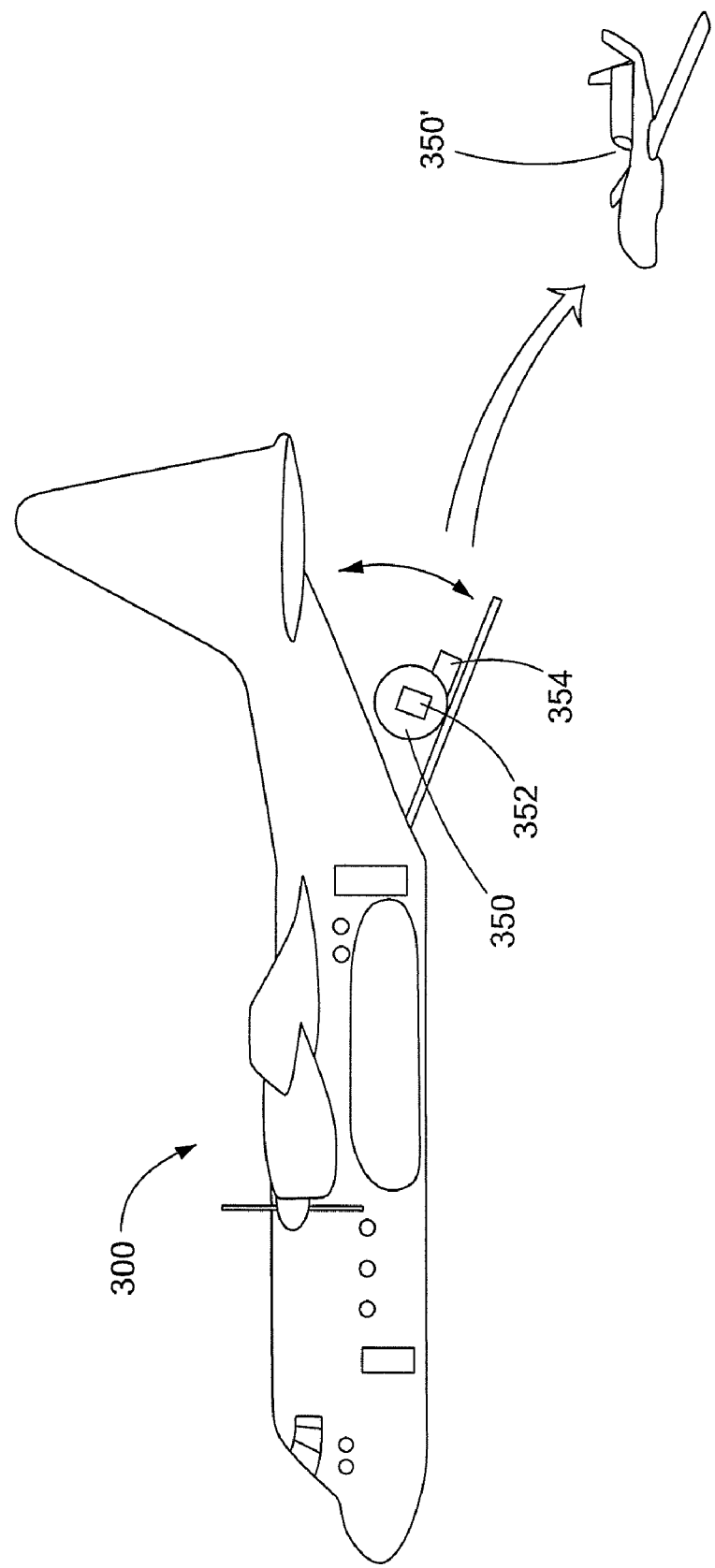
FIG. 4 is a pictorial representation of a UAV having an eyewall sensor that is to launched from an aircraft.

FIG. 4 shows an exemplary vehicle launch from an aircraft 300, such as a C-130 aircraft. In general, the launch system 300 launches an LTA vehicle 350 having an inflation mechanism 352 to rapidly inflate an uninflated LTA vehicle after launch. After inflation, the LTA vehicle 350' can be set to autonomous control using its onboard sensors, navigation, and control systems or be remote controlled to fly at a desired altitude and location within the eye of the hurricane. The LTA 350 includes an eyewall sensor 354 and other equipment to determine and transmit the eyewall location and other weather data.

In another aspect of the invention, a UAV is provided as an unmanned drone having an eyewall sensor and weather equipment. The UAV can be provided as a PREDATOR type drone or GLOBAL HAWK type vehicle, for example, modified to contain the eyewall sensor and other equipment. The drone UAV is typically powered by one or more propellers and navigated by remote control. In one embodiment, the drone UAV is controlled remotely by a user where eyewall location information from the onboard eyewall sensor is conveyed to the user. In an alternative embodiment, the eyewall sensor is coupled to a navigation module to enable autonomous control by the UAV within the eye.

In one embodiment, a LTA UAV is launched into the eye of a hurricane at a constant altitude from between 3000 and 5000 feet. The delivery aircraft loiters for a limited amount of time providing limited operational calibration functionality and uplink verification from the deployed vehicle. In one particular embodiment, the LTA UAV is placed on a pallet from which it releases during launch. The pallet utilizes parachutes to slow its descent while a helium inflation system, which can remain with the pallet, inflates the LTA vehicle.

In an illustrative embodiment, the LTA UAV has a deployed volume in the order of about 10000 ft3, 60 ft length, and 20 ft diameter with a deployed weight in the order of 1000 pounds. A gondola, which can be about 8 ft by 6 ft wide, and 4 feet high, can contain the payload, maneuvering system and controls, communication system, fuel tanks, air/helium tanks, etc.

Figure 5:
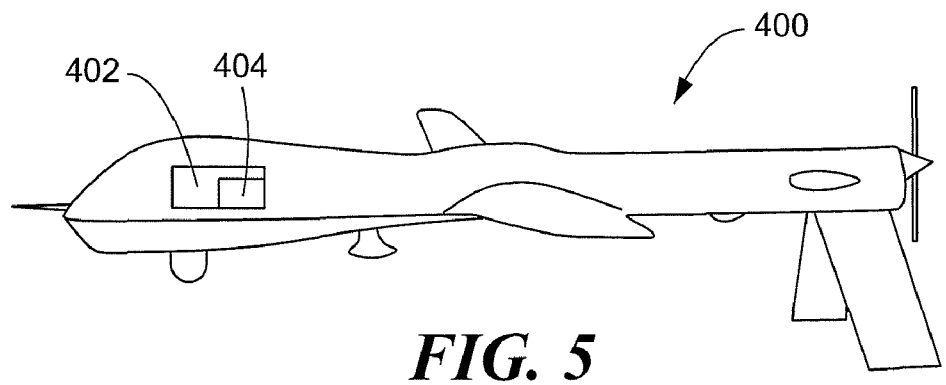
FIG. 5 is a pictorial representation of a UAV as a propeller or jet powered aircraft having an eyewall sensor.

FIG. 5 shows an exemplary UAV 400 in the form of a propeller or jet driven winged aircraft having a sensor suite 402 including an eyewall sensor 404. As described above, the UAV 400 can be controlled remotely based upon information from the eyewall sensor. Alternatively, the UAV can be autonomous with a mechanism to use information from the eyewall sensor 404 to stay within the eye.

It is understood that a variety of mechanisms can be used to launch UAVs into the eye of a hurricane. Exemplary mechanisms include launches from high altitude aircraft, spiral descents from above into the eye, launches from ships, launches from submarines, and penetrations through the eyewall into the eye. Another mechanism includes placing a UAV on or in the water in front of a storm and activating, e.g., inflating the UAV into the eye. In one embodiment, the UAV is secured to the top or bottom of a large aircraft, such as a 747, and released at a desired location over the storm. The released UAV can then gracefully descend into the hurricane eye and provide eyewall location information and other weather data.

Figure 6:
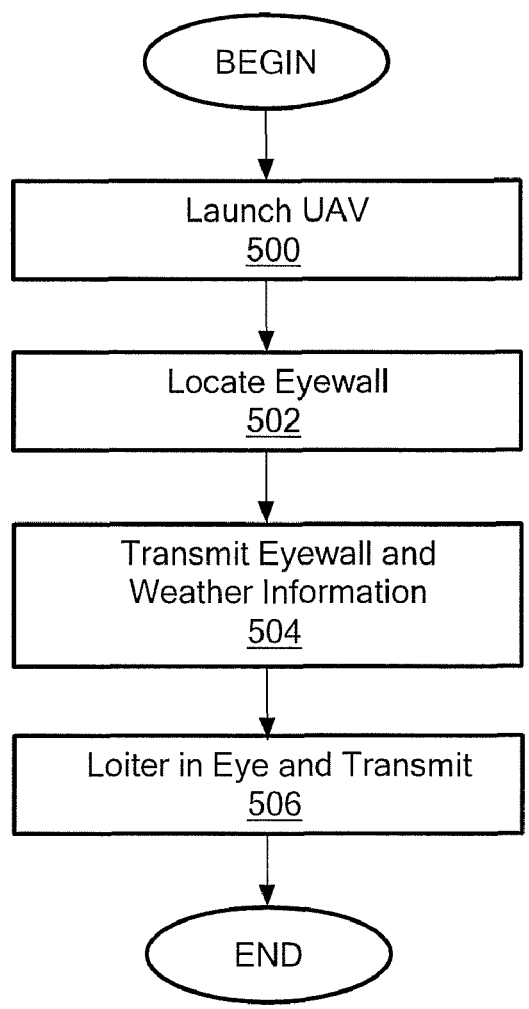
FIG. 6 is a flow diagram shows an exemplary sequence of steps for a UAV to loiter in the eye of a hurricane and transmit weather information.

FIG. 6 shows an exemplary flow diagram showing an exemplary sequence of steps to provide weather information from the eye of a hurricane in accordance with exemplary embodiments of the invention. In step 500, a UAV is launched from an aircraft or other vehicle. In step 502, the eyewall of the hurricane is located using an onboard eyewall sensor. The UAV moves within the hurricane eye and provides eyewall location information, and other weather information to a remote location via wireless link in step 504. It some embodiments, video camera equipment can stream hurricane video to a remote location. In step 506, the UAV loiters in the eye and continues to provide eyewall and other information as the storm continues along a path.

Figure 7:
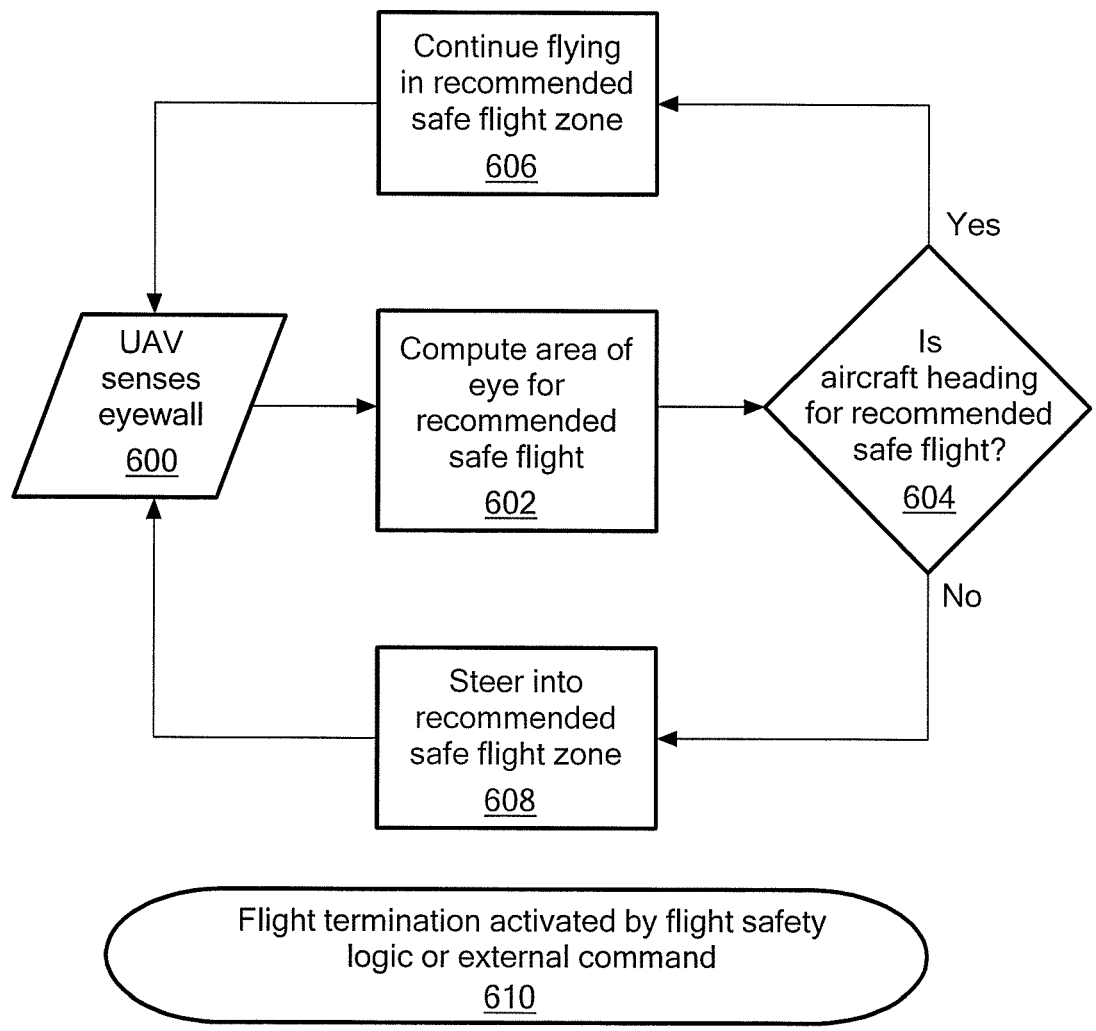
FIG. 7 is a flow diagram showing a high level control loop using eyewall sensor data to navigate or loiter so as to keep a UAV within the eye.

FIG. 7 shows exemplary processing to keep the UAV within the eye of the storm. In step 600, the eyewall sensor in the UAV senses the eyewall and determines the eyewall location in relation to the UAV. In step 602, the control module 106 (FIG. 2), for example, computes an area within the eye in which the UAV can safely fly. Using feedback, the UAV determines in step 604 whether the aircraft heading will keep the UAV within the area recommended for safe flight. If so, then in step 606 the UAV continues flying within the recommended area. If not, in step 608 the UAV heading is altered until the UAV steers to remain within the recommended area. Flight termination mode in step 610 can be entered upon remote command, flight safety logic or other conditions.

In general, the eyewall sensor provides the eyewall location to enable the UAV to fly within the eye indefinitely. The UAV can follow predetermined paths within an eye, for example, flying in a radial pattern to stay a selected distance from the eyewall. Other illustrative patterns include so-called figure eights. In addition, the UAV can change altitudes to vary the data collected by the sensors. For example, images can be collected at different altitudes.

Relatively low altitudes for the UAV provide certain advantages including:

Detailed observations of the near-surface tropical cyclone boundary-layer environment within the eye would provide real-time near-surface wind and thermodynamic data, including the most accurate possible surface pressure.

Low altitude observations would facilitate inexpensive between-cloud and below-cloud surface visible imaging when lighting and visibility conditions permit it Using feature-tracking algorithms analogous to those used operationally for cloud- and water-vapor winds, low-altitude radar imagery sequences would yield continuous wind fields in the lowest 1 km.

Temperature and humidity profiles are achievable through a miniaturized upward-looking FTS spectrometer.

Most accurate IR sea-surface temperature (100% cloud-free areas only).

Potential for microwave radiometer sea surface temperature retrieval audio/video for damage assessment and/or news reporting Relatively high UAV altitudes include the following advantages:

Temperature and humidity profiles to cloud tops are achievable through a miniaturized downward-looking FTS spectrometer Continuous imaging of the storm (subject to data rate constraints; lossy compression OK)

Direct in situ sensing of the upper environment to the storm

Observations of cloud top height and morphology

Potential for microwave radiometer sea surface temperature retrieval audio/video for damage assessment and/or news reporting In general, aircraft will have a recommended and caution flight envelope. An exemplary recommended altitude is from about 200 to about 3000 feet. A caution zone extends beyond the recommended altitude to as low as about 100 feet and as high as about 5000 feet. Some UAVs will have broader operational flight envelopes and the envelope may be extended accordingly.

It is understood that the term UAV should be construed broadly to include lighter and heavier than air, propelled, steered, jet powered, propeller powered, helicopter-type, vehicles and systems in general that are capable of flying, gliding or otherwise remaining airborne for some length of time. For example, embodiments having eyewall sensors carried by so-called smart balloons are contemplated. While the ability to control such balloons may be limited, it is possible that the balloons may remain within the eye for sufficient time to provide information of value.

The present invention provides methods and apparatus for an UAV/UAS to a platform for scientific research that remains in the eye for an extended period of time, such as days at a time. Comprehensive hurricane data can be collected in a primary mission. Other data can be collected, such as news reporting, lightning information, and EO/IR sensor data.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

In one aspect of the invention, a method can include one or more of the following features:

detecting an eyewall of a hurricane with an eyewall sensor onboard an unmanned aerial vehicle (UAV), using information from the eyewall sensor to keep the UAV within the eye;

receiving navigation directions from a remote user, receiving navigation directions from a remote user, wherein the user relies upon eye location information from the eyewall sensor, transmitting information from onboard sensors to a remote location, the UAV is a lighter than air vehicle, the UAV is a heavier than air vehicle, the UAV is a propeller driven vehicle, the UAV is a jet propelled vehicle, the UAV is under autonomous control and uses information from the eyewall sensor to stay within the eye, launching the UAV from an aircraft;

launching the UAV from land, launching the UAV from a submarine, launching the UAV from a ship, launching the UAV from high altitude, and inflating the UAV after launch into the eye.

In a further aspect of the invention, a vehicle includes one or more of the following features:

a UAV having an eyewall sensor, a navigation system coupled to the eyewall sensor, the navigation system provide autonomous control of the UAV to remain with the eye of a hurricane using information from the eyewall sensor, the navigation system receives remote control commands to steer the UAV, where a user remotely controls the UAV using information from eyewall sensor to keep the UAV within the eye, a mechanism to inflate the UAV, the UAV is lighter than air (LTA), and the UAV has a propeller.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:

detecting an eyewall for an eye of a hurricane with an eyewall sensor onboard an aerial vehicle;

receiving navigation directions from a remote user for the aerial vehicle;

using eyewall location information from the eyewall sensor to keep the aerial vehicle within the eye of the hurricane; and transmitting information from onboard sensors for sensing hurricane parameters to a remote location, wherein the aerial vehicle is an unmanned aerial vehicle (UAV).

2. The method according to claim 1, wherein the UAV is autonomous.

3. The method according to claim 1, further including launching a weather balloon in the eye from the aerial vehicle.

4. The method according to claim 1, wherein the eyewall sensor includes a radar system to detect the eyewall.

5. The method according to claim 1, further including launching the UAV from an aircraft into the eye.

6. The method according to claim 5, wherein the UAV is a lighter than air (LTA) vehicle and further including inflating the LTA after launch.

7. The method according to claim 1, further including launching the UAV from an ocean vessel.

8. The method according to claim 1, further including letting the UAV float on ocean surface and launching the UAV when within the eye.

9. The method according to claim 1, further including launching the UAV from land and flying to the eye.

10. The method according to claim 1, further including maintaining a selected distance from the eyewall.

11. A system, comprising:
a communication module to communicate with a remote station;
a navigation module to determine navigation information for an airborne vehicle;
an eyewall sensor to detect hurricane eyewalls, the eyewall sensor coupled to the navigation module to provide eyewall location information to the navigation module for enabling an airborne vehicle to stay within an eye of a hurricane, wherein the system is adapted for being onboard an unmanned aerial vehicle (UAV).

12. The system according to claim 11, further including a sensor module for sensing hurricane parameters.

13. The system according to claim 11, wherein the eyewall sensor includes a radar system to detect the eyewall.

14. An aerial vehicle, comprising:
a communication module to communicate with a remote station;
a navigation module to determine navigation information for an airborne vehicle;
an eyewall sensor onboard the aerial vehicle to detect hurricane eyewalls, the eyewall sensor coupled to the navigation module to provide eyewall location information to the navigation module for enabling the airborne vehicle to stay within an eye of a hurricane, wherein the aerial vehicle is an unmanned aerial vehicle (UAV).

15. The vehicle according to claim 14, further including a sensor module for sensing hurricane parameters.

16. The vehicle according to claim 14, wherein the UAV is autonomous.

17. The vehicle according to claim 14, wherein the UAV is a lighter than air (LTA) vehicle.

\* \* \* \* \*